United States Patent
Rivas et al.

(10) Patent No.: US 9,617,645 B1
(45) Date of Patent: Apr. 11, 2017

(54) ANTI-CORROSION AND WATER-REPELLENT SUBSTANCE AND METHOD

(71) Applicant: MicroCor Technologies, Inc., Odessa, TX (US)

(72) Inventors: Stephen Philip Rivas, Sterling, KS (US); Jose de Bivar-Branco, Odessa, TX (US)

( * ) Notice: Subject to any disclaimer, the term of this patent is extended or adjusted under 35 U.S.C. 154(b) by 0 days.

(21) Appl. No.: 15/376,445

(22) Filed: Dec. 12, 2016

Related U.S. Application Data

(63) Continuation-in-part of application No. 15/138,057, filed on Apr. 25, 2016, now abandoned.

(60) Provisional application No. 62/152,625, filed on Apr. 24, 2015.

(51) Int. Cl.
| | |
|---|---|
| C23F 11/14 | (2006.01) |
| C09D 5/00 | (2006.01) |
| C09D 5/08 | (2006.01) |
| B05D 1/02 | (2006.01) |
| B05D 1/28 | (2006.01) |
| B05D 1/18 | (2006.01) |

(52) U.S. Cl.
CPC .............. C23F 11/147 (2013.01); B05D 1/02 (2013.01); B05D 1/18 (2013.01); B05D 1/28 (2013.01); C09D 5/00 (2013.01); C09D 5/08 (2013.01)

(58) Field of Classification Search
CPC . C09D 5/00; C09D 5/008; C09D 5/08; B05D 1/02; B05D 1/18; B05D 1/28
See application file for complete search history.

(56) References Cited

U.S. PATENT DOCUMENTS

| | | | |
|---|---|---|---|
| 4,325,854 A | 4/1982 | Roberts et al. | |
| 5,690,862 A | 11/1997 | Moore, Jr. et al. | |
| 5,707,954 A * | 1/1998 | Lee ....................... | C23G 5/028 134/40 |
| 5,792,277 A * | 8/1998 | Shubkin ................. | C11D 7/261 134/19 |
| 5,824,162 A * | 10/1998 | Clark ....................... | C11D 7/24 134/31 |
| 5,936,059 A | 8/1999 | Zaid | |
| 5,938,859 A * | 8/1999 | Clark ....................... | C11D 7/24 134/11 |
| 5,945,164 A | 8/1999 | Zaid | |
| 6,103,864 A | 8/2000 | Alston et al. | |
| 6,176,942 B1 * | 1/2001 | Clark ....................... | C11D 7/24 134/11 |
| 6,365,565 B1 | 4/2002 | Thenappan et al. | |
| 6,402,857 B2 * | 6/2002 | Clark ....................... | C11D 7/24 134/11 |
| 7,407,687 B2 | 8/2008 | Zaid et al. | |
| 8,100,987 B2 * | 1/2012 | Middleton .............. | D06F 35/00 134/40 |
| 8,575,237 B1 | 11/2013 | Zaid et al. | |
| 8,969,279 B2 * | 3/2015 | Miwa .................... | C08G 85/008 134/22.19 |
| 2003/0083220 A1 | 5/2003 | Doyel et al. | |
| 2008/0177116 A1 * | 7/2008 | Mutterer ................ | C07C 17/16 570/200 |
| 2016/0312368 A1 * | 10/2016 | Rivas ...................... | C23F 11/10 |

FOREIGN PATENT DOCUMENTS

| | | | |
|---|---|---|---|
| CN | 102936542 A | * | 2/2013 |
| CN | 104046268 | | 9/2014 |
| CN | 105505624 A | * | 4/2016 |
| DE | 2143507 | | 3/1973 |

* cited by examiner

*Primary Examiner* — Anthony J Green
(74) *Attorney, Agent, or Firm* — Law Office of Mark Brown, LLC; Mark E. Brown

(57) ABSTRACT

An anti-corrosion and water-repellent substance configured for application to surfaces of materials to prevent corrosion and otherwise protect those materials. The substance consists of 1-bromopropane, nitromethane, ethyloxirane, and highly refined paraffin wax. In a preferred embodiment of a method of treating materials, the anti-corrosion and water-repellent substance is sprayed on a surface. In other embodiments, the substance may be applied with a brush or roller. In yet another embodiment, the substance may be applied by immersing the items being treated for optimal coverage of their exposed surfaces. The substance adheres to various materials and protects them by repelling water, acids, salt brines, and other substances and elements, including corrosives.

6 Claims, No Drawings

ANTI-CORROSION AND WATER-REPELLENT SUBSTANCE AND METHOD

CROSS-REFERENCE TO RELATED APPLICATION

This application is a continuation-in-part of and claims priority in U.S. patent application Ser. No. 15/138,057, filed Apr. 25, 2016, and now abandoned, which claims priority in U.S. Provisional Patent Application No. 62/152,625, filed Apr. 24, 2015, both of which are incorporated herein by reference.

BACKGROUND OF THE INVENTION

1. Field of the Invention

The present invention relates generally to substances for preventing corrosion and repelling water, and material treatment methods.

2. Description of the Related Art

Metal corrosion is the gradual destruction of metals by chemical reactions with their environment. Exposure to oxidizing agents, such as oxygen, salt brine, acids, etc., commonly causes corrosion in metals. Some metals corrode merely from exposure to moisture in the air. Corrosion degrades useful properties of materials and structures including strength, appearance, and permeability of liquids and gases. Corrosion, such as rusting, can cause major dangers to the safety of vehicles and infrastructure. Degradation of reinforcement bars, or rebar, within concrete structures can cause significant damage to infrastructure, as well as corrosion of structures made entirely of metal. Moreover, moisture penetration and saturation can cause significant problems with other materials, such as wood, concrete, masonry, stone and painted metal. Such problems are particularly prevalent with materials exposed to ambient conditions, including precipitation, ultraviolet (UV) radiation from sunlight, freeze-thaw cycles, etc. The present invention inhibits corrosion and provides water-repellent protection for various materials. Moreover, a substance embodying the present invention provides resistance to acids, water, salt brines, and other corrosive elements. The substance can be applied by spraying, brushing, immersion and by other suitable methods.

Heretofore there has not been available an anti-corrosion and water-repellent substance and treatment method with the advantages and features of the disclosed subject matter.

SUMMARY OF THE INVENTION

In the practice of an aspect of the present invention, an anti-corrosion and water-repellent substance is configured for being applied to a variety of surfaces, including bare metal, wood, concrete, masonry, stone and painted surfaces. This embodiment provides excellent adhesion and creates a hydrophobic film. The anti-corrosion and water-repellent substance is non-flammable and provides resistance to water, salt brine, acids, and other elements to prevent corrosion of the surfaces it is applied to.

DETAILED DESCRIPTION OF THE PREFERRED EMBODIMENTS

As required, detailed aspects of the disclosed subject matter are disclosed herein; however, it is to be understood that the disclosed aspects are merely exemplary of the invention, which may be embodied in various forms. Therefore, specific compositional and functional details disclosed herein are not to be interpreted as limiting, but merely as a basis for the claims and as a representative basis for teaching one skilled in the art how to variously employ the present invention in virtually any appropriately detailed structure.

In an embodiment of the present invention, an anti-corrosion substance is configured for being sprayed onto the surface of a material to resist corrosive substances. Alternatively, the anti-corrosion substance could be applied to a surface with a brush or roller or the surface could be immersed in the substance. The anti-corrosive and water-repellent substance includes a mixture of solvents, described below, and saturated aliphatic hydrocarbons, commonly known as paraffin wax. This embodiment is produced by a complex process of refining, de-oiling, decontaminating and purifying common paraffin wax, which process functions to increase the carbon chain and purity of the wax, which significantly increases the adhesion properties of the dry film, including to painted surfaces. This process also increases the "stackability" of the molecular structure, which provides the ability to apply a significantly thinner film without significant discoloration of the treated surface. Additionally, this allows the present invention to avoid the use of additional oils and solvent mixtures found in other products, which allows this embodiment of the present invention to be translucent and allow the target substrate's aesthetic color and texture to remain visible through the film. The composition of one embodiment of the invention includes 69.8-94.98% 1-bromopropane (CAS No. 106-94-5), 0.001-0.1% nitromethane (CAS No. 75-52-5), and 0.001-0.1% ethyloxirane (CAS No. 106-88-7), and 5-30% highly refined paraffin wax, as described previously. When applied, this embodiment of the invention creates a hydrophobic film, providing resistance to water, salt brine, acids, and other corrosive elements. This substance is inert, dielectric, and non-flammable, and it is able to cover more than 1,000 square feet per gallon. This embodiment can be used as a temporary coating because it can be removed with hot water pressure washing. This embodiment can be applied to painted equipment and/or agricultural implements prior to being sold in order to protect them from corrosion and to preserve their appearances. The substance may also be used on other types of metal or concrete structures, such as bridges, buildings, etc.

It is to be understood that while certain aspects of the disclosed subject matter have been shown and described, the disclosed subject matter is not limited thereto and encompasses various other embodiments and aspects.

Having thus described the invention, what is claimed as new and desired to be secured by Letters Patent is:

1. An anti-corrosion and water-repellent substance consisting of:
   69.8-94.98% 1-bromopropane (CAS No. 106-94-5);
   5-30% saturated aliphatic hydrocarbons derived from refined, de-oiled, decontaminated and purified paraffin wax;
   0.01-0.1% nitromethane (CAS No. 75-52-5); and
   0.01-0.1% ethyloxirane (CAS No. 106-88-7).

2. An anti-corrosion and water-repellent treatment method, which comprises treating a material with the substance as defined in claim 1.

3. The treatment method of claim 2, wherein said treating includes spraying said substance on the material being treated.

4. The treatment method of claim 2, wherein said treating includes brushing said substance on the material being treated.

5. The treatment method of claim 2, wherein said treating includes immersing said material being treated in said substance.

6. The treatment method of claim 2, wherein said material is selected from the group consisting of: bare metal; painted surfaces; wood; concrete; masonry; and stone.

* * * * *